No. 863,527. PATENTED AUG. 13, 1907.
F. FRITZ.
TOOTH FASTENER.
APPLICATION FILED MAR. 25, 1907.

Witnesses
Jesse C. Miller
R. C. Barrett

Inventor
Frank Fritz.

Attorney

UNITED STATES PATENT OFFICE.

FRANK FRITZ, OF ALEXANDRIA, MINNESOTA.

TOOTH-FASTENER.

No. 863,527.　　　Specification of Letters Patent.　　　Patented Aug. 13, 1907.

Application filed March 25, 1907. Serial No. 364,368.

*To all whom it may concern:*

Be it known that I, FRANK FRITZ, a citizen of the United States, residing at Alexandria, in the county of Douglas, State of Minnesota, have invented certain new and useful Improvements in Tooth-Fasteners; and I do hereby declare the following to be a full, clear, and exact description of the invention, such as will enable others skilled in the art to which it appertains to make and use the same.

This invention relates to new and useful improvements in fasteners for the teeth of threshing machine concaves, and it has for its object to provide a device of the above type embodying a novel construction, combination and arrangement of parts, the details of which will appear in the course of the following description, in which reference is had to the accompanying drawings forming a part of this specification, like characters of reference designating similar parts throughout the several views, wherein:—

Figure 1:
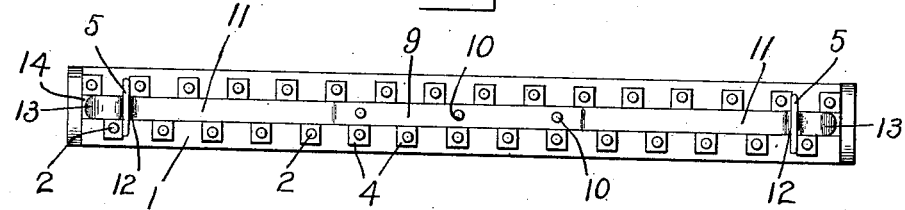
Figure 2:
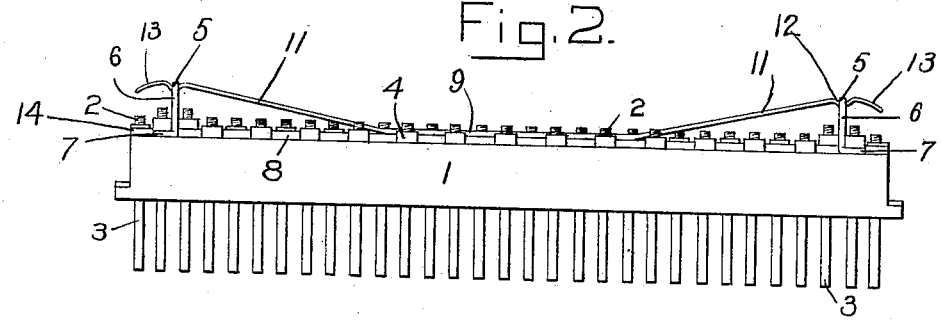
Figure 3:
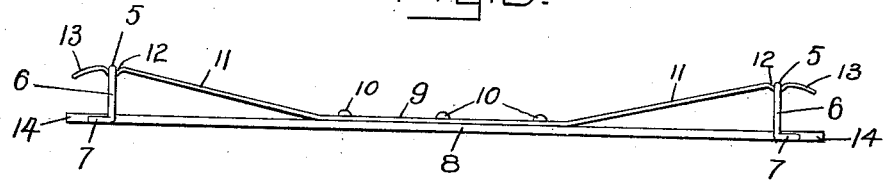
Figure 4:
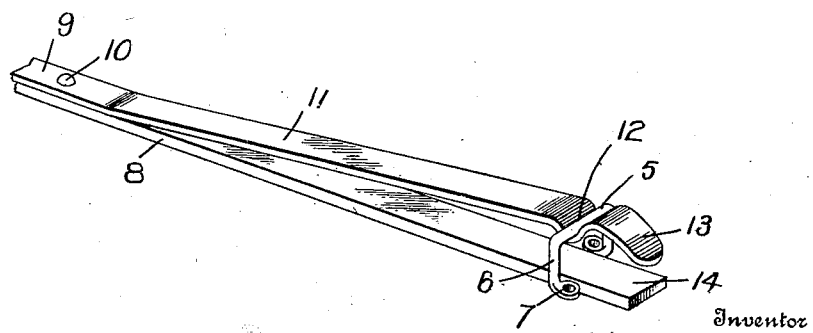

Figure 1 is a top plan view of the underneath side of a section of a concave used in threshing machines, and having the invention forming the subject matter of the present application applied thereto. Fig. 2 is a side elevation thereof. Fig. 3 is a side elevation of a fastening device detached from the concave, and Fig. 4 is a detail perspective view of one of the elements of such fastening device, to be hereinafter specifically referred to.

Referring to the accompanying drawings, the numeral 1 designates a section or plate embodied in the concave, having shanks 2 of the threshing teeth 3 projected therethrough, said teeth being arranged in parallel rows, and carrying nuts 4 upon the projecting threaded portions of their shanks 2. The nuts 4 are of the square shape ordinarily employed in the art to which the invention relates, and have their flat sides disposed in alined or coincident relation.

It is to be noted that the members of each line of teeth 3 are arranged in staggered relation with respect to the members opposite thereto. The nuts 4 on the end teeth of each line correspondingly constitute fastening means for the member shown in Fig. 4. Said member is designated by the numeral 5, and has depending legs 6, which at their lower ends are provided with angular oppositely extending loops 7, the latter loosely surrounding the shanks 2 of the end teeth between the plate 1 and the nuts 4, said nuts being of course turned tightly upon the material of said loops. The means for holding said nuts against rotation is constituted of a bar 8, arranged therebetween longitudinally of the plate 1, and with its straight side edges engaging the adjacent flat sides of the nuts 4, and preventing the accidental displacement of said nuts. The bar 8 is loosely imposed on the plate 1 but is held from displacement upon said plate by a leaf spring 9, secured at its central portion by rivets or screws 10, to the central portion of said bar 8. The free resilient ends 11 are projected underneath the horizontal arm of the member 5, and adjacent their extremities are formed with depressions or recesses 12 stamped thereinto, and engaging said horizontal arm so as to prevent longitudinal movement of said spring and the bar 8 fixed thereto.

The advantages of use will be readily apparent from the foregoing description.

In the art as ordinarily practiced, it is necessary to remove the screws or fastening means, which are employed to fasten the locking plate to the concave plate or section. This operation involves considerable time, is tedious and uncertain, and very laborious. In the present invention, when it is desired to remove a nut, all that is necessary is to depress the projecting end 13 at the extremities of the spring 9, and using the projecting end 14 at either extremity of the bar 8 to slide said bar upon the section 1 until it is entirely or partially removed therefrom as may be desired, and when the bar 8 has been moved sufficiently, the selected nut 4 may be readily removed. The bar 8 may be forced back into its position between the parallel lines of nuts by depressing the ends 14 of the spring, and sliding said bar between the lines of nuts.

From the foregoing description, it will be seen that simple and efficient means are provided for accomplishing the objects of the invention, but while the elements herein shown and described are well adapted to serve the functions set forth, it is obvious that various minor changes may be made in the proportions, shape and arrangement of the several parts without departing from the spirit and scope of the invention as defined in the appended claims.

What is claimed is:

1. The combination with a plate, of a threshing machine concave, teeth having their shanks projecting through said plate, and nuts mounted upon said shanks and disposed in parallel rows, of a longitudinal bar imposed upon said plate between said nuts, and means for holding said bar upon said plate in resilient yieldable relation.

2. The combination with a plate of a threshing machine concave, teeth having their shanks projected through said plate and nuts mounted upon said shanks and disposed in parallel rows, of a longitudinal bar imposed upon said plate, fixed members carried by said plate, and a spring carried upon said bar and bearing with its free end against each of said fixed members.

3. The combination with a plate of a threshing machine concave, teeth having their shanks projecting through said plate and nuts mounted upon said shanks and disposed in parallel rows, of a longitudinal bar loosely imposed upon said plate between said rows, fixed members carried by said plate at the end thereof, a leaf spring secured along its central portion to the central portion of said plate, said leaf spring having free projecting ends positively engaged with said fixed members, and portions of said leaf springs projecting beyond said fixed members and affording finger pieces.

4. The combination with a plate of a threshing machine concave, teeth having their shanks projecting through said plate and nuts mounted upon said shanks and disposed in parallel rows, of a longitudinal bar loosely imposed upon said plate between said rows, fixed members carried by said plate, and overhanging said bar at the ends thereof, and a leaf spring secured along its central portion to the central portion of said plate longitudinally thereof, said leaf spring having its free ends formed for positive engagement in said fixed members.

In testimony whereof, I affix my signature, in presence of two witnesses.

FRANK FRITZ.

Witnesses:
F. E. ULLMAN,
P. H. LEY.